UNITED STATES PATENT OFFICE.

JOHN A. WILSON, OF ELIZABETH, NEW JERSEY, ASSIGNOR TO THE DURATEX COMPANY, OF NEWARK, NEW JERSEY, A CORPORATION OF NEW JERSEY.

COATED FABRIC AND PROCESS OF PRODUCING THE SAME.

1,352,163.

Specification of Letters Patent.   Patented Sept. 7, 1920.

No Drawing.   Application filed December 19, 1919.   Serial No. 346,160½.

*To all whom it may concern:*

Be it known that I, JOHN A. WILSON, a citizen of the United States, residing at Elizabeth, New Jersey, have invented certain new and useful Improvements in Coated Fabrics and Processes of Producing the Same, of which I declare the following to be a full, clear, and exact description.

This invention relates to improvements in coated fabrics and the process of producing the same.

This invention relates particularly to water-proof fabrics, of the type sometimes known as rubberized fabrics, which are manufactured by coating a suitable textile fabric with rubber, then vulcanizing the rubber coating so as to produce a coated fabric which is entirely water proof, may be subjected to considerable flexing or bending without damaging the coating, and is suited for use in many places, and particularly as an automobile top material.

One of the chief objects of my invention is to provide a water-proof fabric in which the water proof qualities are improved, and which presents a very attractive appearance due to the fact that it is embossed with a more distinct figure.

Another object of my invention is to improve, simplify and cheapen the production of such fabrics.

Further objects, and objects relating to details and economies of production, will definitely appear from the detailed description to follow. In one instance, I accomplish the objects of my invention by the means described in the following specification.

Heretofore in producing rubber coated waterproof fabrics, it has been customary to apply a coating of rubber, or rubber compound, to a textile fabric, such as a cotton drill for example. This rubber coated fabric then has starch sifted or sprinkled over it, and is run between hot embossing rolls which impress the desired figure in the rubber coating on the fabric. The rubber coated and embossed fabric is then vulcanized in a rubber heater in the manner well known in this art. It appears that the rubber coating is in a soft, sticky state when it is passed between the hot embossing rolls, and therefore, the powdered starch must be applied to prevent the rubber from sticking to the embossing rolls. The fact that these rolls are hot tends to make the rubber stick more than it naturally would. The use of this starch is very objectionable in the factory, as the air is filled with it, and it does not entirely prevent the sticking of the rubber to the embossing rolls if they are as hot as would otherwise be desirable.

I accomplish the objects of my invention by applying what I term a clear, vulcanizing varnish to the unvulcanized rubber coated fabric, before it is passed through the embossing rolls, and then vulcanizing the rubber coating and the varnish coating simultaneously. This renders the starch unnecessary, and it is eliminated.

In practice, I coat textile fabric, such, for example, as a cotton drill, with a rubber solution of the proper composition and consistency, the composition of this rubber solution forming no part of my present invention. After this coating of rubber is applied to the fabric, I apply a coating of a liquid composition made up by adding eight pounds of sulfur to about 25 gallons of linseed oil, intimately mixing these constituents, and then heating to the proper thickness and thinning the mixture to the proper consistency with naphtha. The rubber coated fabric is run through the embossing rolls after this liquid coating is applied, and before it has had time to dry. This coating prevents the rubber from sticking to the rolls during the embossing process, and the embossing rolls may be hotter so as to give a more distinct figure to the fabric. After passing through the embossing rolls, the fabric is conducted into a rubber heater where it is festooned and vulcanized by heating to about 240° F. for about two and a half to three hours. If desired, another luster coat of varnish may be applied after embossing and before vulcanizing. After being vulcanized, this water-proof fabric is ready to be cut up in pieces and rolled for shipment.

I have described what I term a clear vulcanizing varnish made of linseed oil and sulfur, but I am not restricted to the use of linseed oil. In general, I find that I may use any vegetable oil which is either a drying or a semi-drying oil. Among the oils which I contemplate as within the scope of my invention are linseed oil, tung oil, hempseed oil, cottonseed oil, and rape oil. It will be noted that the rubber coating and the vulcanizing varnish which is applied to the coating are both vulcanized simultaneously, and, this is important because, if the rubber coating is vulcanized and a vulcanizing varnish applied, which is later vulcanized, this causes a double vulcanization of the rubber coating, with the result that it is over-cured and deteriorates.

Having thus described my invention, what I claim as new and desire to secure by Letters Patent, is:—

1. The process of producing a waterproof fabric, consisting in coating a fabric with rubber, applying a liquid coating constituting a clear vulcanizing varnish, embossing said coated fabric, and then vulcanizing both said coatings simultaneously.

2. The process of producing a water proof fabric, consisting in coating a fabric with rubber, applying a liquid coating composed of a vegetable oil and sulfur, embossing said coated fabric, and then vulcanizing both said coatings simultaneously.

3. The process of producing a water proof fabric, consisting in coating a fabric with rubber, applying a liquid coating composed of a vegetable drying oil and sulfur, embossing said coated fabric, and then vulcanizing both said coatings simultaneously.

4. The process of producing a water proof fabric, consisting in coating a fabric with rubber, applying a liquid coating composed of linseed oil and sulfur, embossing said coated fabric, and then vulcanizing both said coatings simultaneously.

5. The process of producing a waterproof fabric, consisting in coating a fabric with rubber, applying a liquid coating composed of a vegetable drying oil and sulfur, then embossing said coated fabric, and then vulcanizing both said coatings simultaneously.

6. A waterproof fabric composed of a textile fabric, a coating of rubber, and a coating of vegetable oil and sulfur, both said coatings being embossed and vulcanized simultaneously on the textile fabric.

7. A waterproof fabric composed of a textile fabric, a coating of rubber, and a coating of vegetable drying oil and sulfur, both of said coatings being embossed and vulcanized simultaneously on the textile fabric.

8. A waterproof fabric composed of a textile fabric, a coating of rubber, and a coating of varnish composed of linseed oil and sulfur, said coatings being embossed and vulcanized simultaneously on the textile fabric.

In testimony whereof I affix my signature.

JOHN A. WILSON.